UNITED STATES PATENT OFFICE.

VICTOR VICTORSON, OF BOSTON, MASSACHUSETTS.

METHOD OF FINISHING THE SURFACE OF WOOD OR LIKE MATERIAL.

SPECIFICATION forming part of Letters Patent No. 507,512, dated October 24, 1893.

Application filed June 5, 1893. Serial No. 476,657. (No specimens.)

*To all whom it may concern:*

Be it known that I, VICTOR VICTORSON, of Boston, county of Suffolk, State of Massachusetts, have invented an Improvement in Methods of Finishing the Surface of Wood and Like Material, of which the following description, in connection with the accompanying drawings, is a specification, like letters on the drawings representing like parts.

In the manufacture of pianos and other articles of wood which require a high finish, it is customary to apply thereto successive coats of varnish, and the higher and more durable the finish desired the greater the number of coats must be applied, usually from four to six coats. Each coat of usual commercial varnish employed on piano cases is exposed to the air in order that the solvent for the varnish gum may be evaporated and let the gum harden, from three to ten days being required between successive coats, and the last body coat is rubbed down to a smooth surface and permitted to stand for several days, when a flow or polishing coat is applied, and before this coat is hard enough to polish it must stand for a period of from ten to thirty days. A small proportion of oil is added usually to varnish, as is well-known, to impart a slight degree of toughness and elasticity thereto, as otherwise the varnish would be too brittle to use and would chip and fly from a very slight blow.

Varnish is peculiarly susceptible to climatic and atmospheric changes, and it is extremely difficult to apply successive coats as described under substantially the same conditions, for if this is not done the different layers will not harden uniformly, the unequal shrinkage of the varnish will cause cracks or checks, and the rubbing necessary to impart a polish will develop all such imperfections.

The usual process is further objectionable because of the time required, as the slow drying necessitates a large amount of stock in various stages of treatment, which involves a large amount of unproductive capital and requires great storage capacity.

The durability of the finish obtained by the process described is not satisfactory, as the evaporation of the solvent continues for a long time after the article treated has left the hands of the finisher, and as the gum and small amount of oil harden, interstices formerly occupied by the solvent will show as fine pores or cells, thus making it impossible to maintain a fine polish. In my experiments to overcome these objections and cheapen the cost of finishing wooden surfaces, particularly piano cases, I have discovered a method for finishing such surfaces in from four to six days, with fewer coats of varnish, at a much less cost, and with positive advantages in the result to be more fully described.

My improved method, now to be described, is applicable to carriage, furniture and other wood-work finishing, and by the term wood-work I include articles made of wood and its compositions.

In carrying out my invention I use a varnish which is rich in an oxidizable oil, that is, which has a high percentage of such an oil to thus materially increase the durability and toughness of the varnish when subsequently treated; and preferably I use raw linseed oil to secure the best results, though good work may be produced with boiled linseed oil or other oxidizable oil, but this varnish must not be confounded with japan, which, though having a considerable percentage of oil, contains such a quantity of asphaltum or equivalent substance that its after treatment must be totally different from that of varnish.

The piano case or other wooden article to be finished, provided or not with usual filling, is coated with a varnish as specified, and placed in an artificially heated chamber, the temperature of which is gradually raised to about 100° Fahrenheit and there maintained for several hours, and toward the end of the heating, which takes from eight to twenty-four hours, according to circumstances, the temperature is increased to 120° Fahrenheit, more or less, until the heating is finished—that is to say, until the varnish is thoroughly dry, and this will occur in varying periods according to the consistence of the varnish, those varnishes of a heavy body requiring a longer time than those of light body, but, from eighteen to forty-eight hours, more or less, usually will suffice. The subjecting of the article to these different temperatures at the stated times and in the stated manner is necessary in order to prevent injuries to the wood work and to the varnish. Throughout the heating or baking a free circulation of air is maintained in the chamber, said air co-operating with the heat in securing the proper and desired result. The gradual application of the heat overcomes any tendency of the varnish to blister, and the heat is never great enough to split or twist the wood or soften the glue, as in a piano case. As the volatile solvent of the varnish is rapidly evaporated and carried away by the current of air the superabundant fluid oil takes its place, and as it is oxidized it fills and hardens in all the minute pores or interstices left by the solvent, so that, with the varnish gum, the oxidized oil forms a hard, even and elastic skin or coat, thoroughly shrunk upon and intimately connected with the surface of the article, and continuous thereon. At the conclusion of the heating, the article is removed from the chamber, and a second coat of the varnish is applied thereto, which is subjected to the gradual heating amid a free circulation of air, as before. As many coats of varnish are thus applied and heated or baked as are desired or necessary, according to the class of work and the nature of the finish. By my method, however, fewer coats are necessary to obtain a given finish than is possible by the usual methods of treatment, for the varnish described and used by me has much more body than the varnish in common use. It is to be observed that varnish having this increased body could not be dried and hardened by the ordinary method of procedure because of the excess of oil, and the treatment herein described is necessary to attain a proper result, the varnish used and its treatment so co-operating, each with the other, that one is of practically little value without the other. I have found that the heating tends to "kill" or deaden some of the valuable qualities of commercial boiled linseed oil, making the varnish brittle and less durable. The successive coats of varnish are thoroughly incorporated with each other, and form as a whole an even, homogeneous, transparent and hard elastic coating, oxidized upon each other, and which will not show any variations or demarcations between the coats when subsequently rubbed. When the last coat has been baked the article is rubbed down in well known manner to a perfectly smooth surface, and then polished; or a flow coat may be applied and baked, which coat may be at once polished by rubbing with water or oil, as desired.

To secure the best results the density and fluidity of the varnish, and its temperature, should be substantially the same for each coat, and if these precautions are observed my method may be successfully practiced in any and all conditions of the weather and atmosphere.

By the use of a varnish rich in an oxidizable oil, in the manner described I obtain a free flow, and a continuous tough surface free from pits or holes, and which, when dry and hard, will not cross crack or check; nor will it sweat after rubbing, but will constitute a most durable and high finish practically proof against atmospheric and climatic changes. To apply such a varnish, and treat by the methods now in vogue, the time necessary to even surface-harden each coat would be so lengthened as to be prohibitive, while the unoxidized mass of oil underneath would remain soft; and on the other hand, ordinary varnish treated by my improved method would quickly dry, but it would cross-crack and check, and the small proportion of oil would be "killed" by the heat so that the surface would be very brittle and chip off in flakes.

Japan cannot be treated by my method, for the low degree of heat would not harden it sufficiently to be used with the most careful handling, and as is well known, japan cannot be rubbed to a polish because the heat generated by the friction softens and rubs up the asphaltum or equivalent constituents. The high degree of heat necessary to bake japan prohibits its use on any substance or article liable to be split, warped, or twisted by such heat, or which is glued together.

While I have herein specified 120° Fahrenheit as the degree to which the temperature is raised in heating the varnish coats, it is to be understood that a few degrees more or less come within the scope of my invention, for if the proportion of oil is slightly increased or decreased a few degrees more or less of heat will be required.

While I have attained the best results with raw or unboiled linseed oil I do not restrict myself to its use in carrying out my invention, as any oxidizable oil capable of giving the requisite durability, toughness and elasticity to the varnish may be employed with good results.

So, also, plain boiled linseed oil may be used, by which term I mean linseed oil boiled only, without the addition of any driers, as distinguished from commercial boiled linseed oil, for as is well known the latter has added thereto various ingredients to increase its oxidizing properties, such as manganese, red lead, litharge, potash, &c. These substances, however, all tend to affect the life and durability of the oil, and hence commercial boiled oil is not well adapted to the carrying out of my invention.

Simple boiling of the oil, as is well known, evaporates the water therein, and thickens and increases the oxidizable properties thereof, but the oil will not flow quite so freely as will raw oil.

I claim—

1. The improvement in the art of finishing the surface of wood, which consists in applying thereto a coat of varnish rich in an oxidizable oil, subjecting it to a temperature gradually raised in a free circulation of air to substantially 120° Fahrenheit and maintaining it at substantially this temperature for a period of from eighteen to forty-eight hours, more or less in accordance with the consistency of the varnish, to thereby evaporate the solvent of the varnish and oxidize and harden evenly throughout the coat the superabundance of oil in the interstices thus formed; applying a second coat of the varnish and treating as before; the successive coats of varnish being separately heated and shrunk one on the other until the desired texture and surface is obtained, whereby a continuous hard elastic finish is rapidly produced, substantially as described.

2. The improvement in the art of finishing the surface of wood, which consists in applying thereto a coat of varnish rich in oxidizable oil, subjecting such coat to a temperature gradually raised in the presence of circulating air to substantially 100° Fahrenheit, and maintained thereat for a time, and thereafter gradually raised to substantially 120° Fahrenheit to thereby evaporate the solvent of the varnish and oxidize and harden the superabundance of oil in the interstices thus formed; applying a second coat of the varnish and treating as before; successive coats of varnish being superposed and separately heated until the desired texture and surface are obtained, and rubbing and polishing the final or flow coat, whereby a continuous hard and highly polished durable finish is produced, substantially as described.

In testimony whereof I have signed my name to this specification in the presence of two subscribing witnesses.

VICTOR VICTORSON.

Witnesses:
FREDERICK L. EMERY,
AUGUSTA E. DEAN.